Inventors:
Frank J. Moles,
Philip C. Michel,
by Prowell P. Mack
Their Attorney.

Dec. 27, 1949  F. J. MOLES ET AL  2,492,759
PHOTOTUBE POWER SUPPLY CIRCUIT
Filed Sept. 13, 1946  2 Sheets-Sheet 2

Inventors:
Frank J. Moles,
Philip C. Michel,
by Provell S. Mack
Their Attorney

Patented Dec. 27, 1949

2,492,759

UNITED STATES PATENT OFFICE 2,492,759

PHOTOTUBE POWER SUPPLY CIRCUIT

Frank J. Moles and Philip C. Michel, Schenectady, N. Y., assignors to General Electric Company, a corporation of New York Application September 13, 1946, Serial No. 696,946

1 Claim. (Cl. 250—214)

Our invention relates to power supply circuits for multiplier phototubes and more particularly to a new and improved A. C. power supply circuit for multiplier phototubes.

Multiplier phototubes may be energized by either a D. C. or an A. C. source. When A. C. is used the phototube cathode is positive with respect to the anode during half of each cycle and the tube is inoperative during that time. A D. C. source allows the tube to be in operative condition continuously.

The desired output of the tube is derived from the anode circuit and it is usually desirable therefore to allow the anode to be at or near ground potential and energize the tube by making the cathode negative with respect to ground. Since most electronic circuits in which a phototube output may be used require a D. C. voltage positive with respect to ground, a separate rectified D. C. source is required for the phototube. Since multiplier tubes require a high cathode to anode voltage it is desirable to avoid the necessity for substantial rectifying equipment whenever possible. This may be done by using an A. C. source.

The use of an A. C. source introduces a disadvantage which will be objectionable in most applications of the phototube and it is desirable that this disadvantage be eliminated. The internal structure of the phototube is such that interelectrode capacitance between the anode and the other electrodes contained therein is inherently present. When energized by an A. C. source the voltages between these electrodes is continuously changing in amount and polarity and charging current flows to and from each of these electrodes because of this capacity. The charging current to the anode will be superimposed upon the desired output current and therefore will subject the equipment controlled by the phototube to an objectionable A. C. fluctuation.

It is an object of our invention to provide a new and improved A. C. power supply circuit for multiplier phototubes whereby the objectionable effects of interelectrode capacitances are eliminated.

Figure 1:
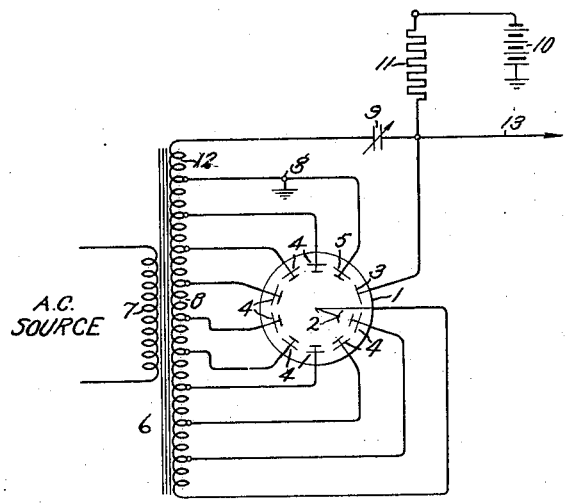
Figure 2:
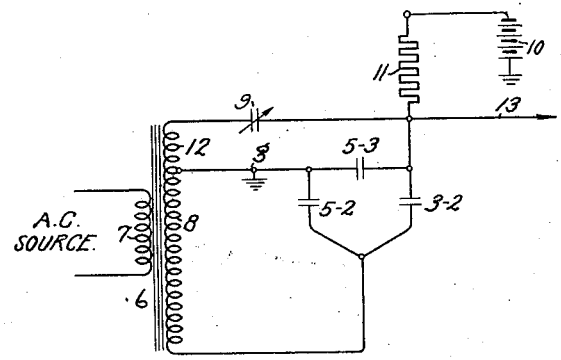

The features of the invention which are believed to be novel and patentable will be pointed out in the claim appended hereto. For a better understanding of the invention, reference is made in the following description to the accompanying drawing in which Fig. 1 is a diagram of a power supply circuit for a multiplier phototube, Fig. 2 is a partial equivalent circuit of the circuit of Fig. 1, Fig. 3 discloses a circuit in which the phototube is totally energized from a single A. C. source and in such a fashion as to eliminate objectionable effects of interelectrode capacitances, Fig. 4 is a partial equivalent circuit of Fig. 3, Fig. 5 discloses the use of alternate means using a single A. C. source and Fig. 6 is a partial equivalent circuit of Fig. 5.

Referring now to Fig. 1, a conventional type multiplier phototube 1 with a light sensitive cathode 2, an anode 3, and intermediate electrodes 4 and 5 usually referred to as dynodes and capable of emitting secondary electrons is connected to an A. C. source through a transformer 6. Dynode 5 is identical with all other intermediate electrodes but is numbered separately to facilitate description of our invention. Transformer 6 includes a primary winding 7 which may be connected to an A. C. source and a multitapped secondary winding 8. Cathode 2 is connected to one end of winding 8 and anode 3 is connected to the other end of winding 8 through an adjustable capacity or condenser 9. Anode 3 is also connected to the positive terminal of a D. C. source such as battery 10 through a resistor 11. Winding 8 is divided into ten preferably equal increments by tapping the winding at nine properly chosen points and a dynode connected to each of these taps in an order such that the dynode adjacent to the cathode is connected to the tap nearest the cathode end of winding 8, the remaining dynodes chosen in sequence from the first dynode towards the anode for sequential taps progressing toward the anode end of winding 8. The portion of winding 8 between dynode 5 and anode 3 is referred to as winding 12 in the following discussion. Dynode 5 and its corresponding tap on winding 8 is grounded as at point g. The desired voltage output or voltage variation caused by light intensity variation on photosensitive cathode 2 is made available between ground and lead 13 which is connected to anode 3.

In Fig. 2 only the single tap on winding 8 to which dynode 5 is connected is shown. Condenser 5—2 represents the interelectrode capacitance between dynode 5 and cathode 2. Condenser 3—2 represents the interelectrode capacitance between the cathode 2 and anode 3, or more exactly, a capacitance equivalent to the combined interelectrode capacitances of anode 3 with respect to each of the electrodes except dynode 5 all referred to an anode to cathode base. Condenser 5—3 represents the interelectrode capacitance between anode 3 and dynode 5.

Figure 3:
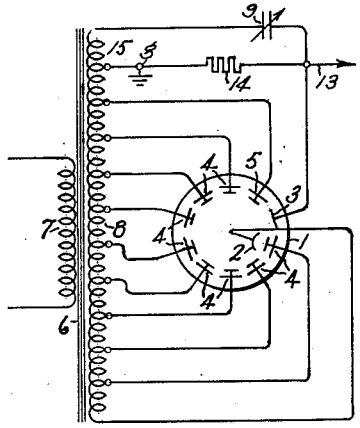
Figure 4:
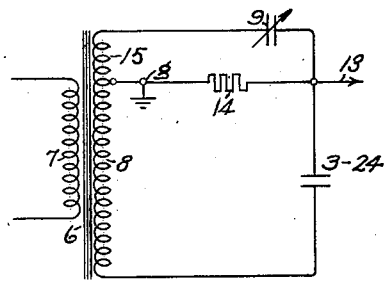

The circuit shown in Fig. 3 is similar to that of Fig. 1 with the following exceptions. Instead of grounding dynode 5 and its lead from winding 12, the lead to the anode or the other side of winding 12 is grounded. A resistance 14 is provided between ground and anode 3. Anode 3 is also connected to one end of winding 15 through condenser 9. The other end of winding 15 is grounded. Winding 15 may be an added portion of winding 8 or a separate secondary winding connected in series additive polarity to winding 8.

In Fig. 4 condenser 3—24 represents the equivalent cathode to anode interelectrode capacitance of the anode with respect to all other electrodes of the tube. Other portions are identical with those of Fig. 3 and are similarly numbered.

Figure 5:
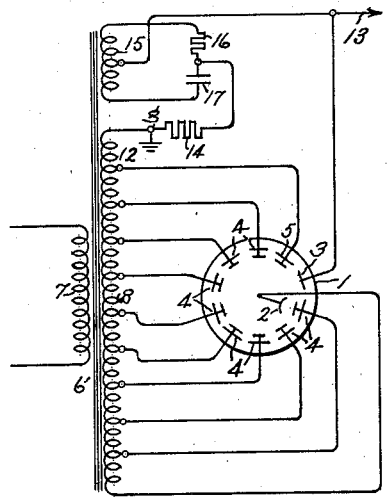
Figure 6:
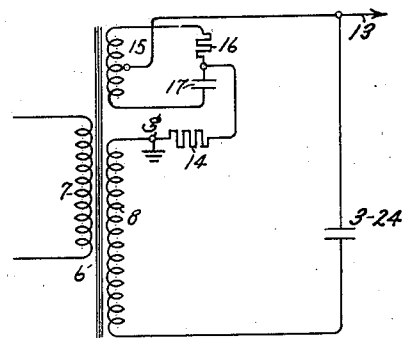

A modification of Fig. 3 is shown in Fig. 5 wherein a phase shifter consisting of resistor 16 and condenser 17 in series across winding 15 provides a voltage between the center tap of winding 15 and the junction of resistor 16 and condenser 17 which is out of phase with respect to the voltage of winding 8 or 15. This voltage is introduced into the circuit between anode 3 and ground. Winding 15 is in this case preferably of such design that its capacitance to ground is small since such capacitance if present shunts resistor 14 which may prove objectionable in some instances. Remaining portions of the circuit are similar to those of Fig. 3 and are similarly numbered.

The partial equivalent circuit shown in Fig. 6 bears similar reference characters to those of Fig. 5. Condenser 3—24 is the same value as that of Fig. 4.

The principles and advantages of our invention may be explained by describing the operation of the circuit and associated phototube. Referring to Fig. 1, assume primary 7 of transformer 6 is energized from a suitable A. C. source and cathode 2 of phototube 1 is receiving no illumination energy. Anode 3 is then positive with respect to ground to an extent equal to the voltage of battery 10 since there is no emission current flowing through resistor 11 which is in series with anode 3. The voltage impressed upon cathode 2 causes an A. C. voltage plus a D. C. component to exist between anode 3 and cathode 2. Similar A. C. voltages to a lesser amount exist between anode 3 and each of the dynodes with the exception of dynode 5. Thus a current flow to and from anode 3 exists since charging current for the interelectrode capacitance as represented by condenser 3—2, Fig. 2, must be supplied to anode 3. If this charging current were supplied through resistor 11 from battery 10 as would be the case if condenser 9 and winding 12 were absent an A. C. voltage drop across resistor 11 would appear as caused by the A. C. charging current. Then the voltage from lead 13 to ground would contain an A. C. component of voltage. This is objectionable since the voltage from lead 13 to ground should be affected only by the amount of illumination striking cathode 2.

This A. C. component of voltage from lead 13 to ground may be eliminated by supplying all the required charging current to anode 3 from a circuit other than the one containing resistor 11. A circuit consisting of condenser 9 and winding 12 in series between anode 3 and ground satisfies that requirement when proper values are chosen in accordance with the following mathematical relationships.

Let $I_c$ = charging current required by anode 3
$E_2$ = voltage of coil 12
$E_1$ = voltage of winding 8 from cathode to ground
$I_2$ = current in condenser 9

Then, assuming lead 13 to remain at fixed potential, as is desired $$I_c = 2f\pi C_{3-2} E_1$$

where $C_{3-2}$ is the interelectrode capacity as previously defined and $$I_2 = 2\pi f C_9 E_2$$

But $I_2$ is equal to $I_c$

Thus $$2\pi f C_9 E_2 = 2\pi f C_{3-2} E_1$$

$C_{3-2}$ may for the usual multiplier phototube be approximately 6 $\mu\mu f$. Although $E_1/E_2$ may be any desired ratio it may be convenient to use a transformer with 8 evenly spaced taps on the secondary in which case $E_1/E_2 = 9$. $C_9$ should then be made equal to 54 $\mu\mu f$. Condenser 9 is preferably adjustable so that the requirements of any particular phototube may be exactly met. If phototube current flows as caused by illumination striking the cathode, the voltage of anode 3 must necessarily decrease because of voltage drop in resistor 11. On A. C. operation phototube current will occur only during that half of each cycle when cathode 2 is negative with respect to anode 3. When the anode voltage decreases the balance between $I_c$ and $I_2$ is disturbed slightly and $I_2$ exceeds $I_c$ by a slight amount. This unbalance current will flow through resistor 11 but will be small compared with the phototube current through resistor 11 and its effect on anode voltage will be essentially negligible. Thus, charging current requirements have no effect upon anode voltage when the phototube is nonconductive and only negligible effect when phototube current flows if an energizing circuit embodying the principles of our invention is utilized.

The same principles may be applied to a circuit utilizing an A. C. source alone. As before, it is only necessary that for a circuit as shown in Fig. 3 that the charging current to condenser 9 and the charging current to anode 3 or its equivalent, condenser 3—24 Fig. 4 be made equal for normal zero anode to ground voltage. When phototube anode current flows through the series resistor 14 the charging current to condenser 9 slightly exceeds the charging current to anode 3 and as before, this excess current flows through the anode series resistor 14 but the voltage across resistor 14 is only negligibly different from that which phototube current alone would cause.

The desired results also may be accomplished by allowing the charging current to flow through the anode series resistor and adding a voltage in series with this resistor between ground and the anode of such phase and value as to exactly equal and oppose the voltage in the anode resistor caused by the charging current. Such a circuit is shown in Fig. 5. For zero anode potential with respect to ground, the charging current $I_2$ to anode 3 or its equivalent $C_{3-24}$ in Fig. 6 equals $I_2 = 2\pi f C_{3-24} E$ where E is the cathode to ground voltage. The voltage drop in resistor 14 is then equal to $I_2 R_{14}$ and since charging current is 90° ahead of the voltage across the condenser being charged this voltage drop is 90° ahead of the voltage of winding 15. Thus a voltage compensating circuit which includes a phase shifter such as resistor 16, and condenser 17 across centertapped winding 15 must be utilized whereby a voltage equal and opposite to $I_2 R_{14}$ may be introduced between anode 3 and resistor 14 thereby maintaining the anode at zero voltage for zero phototube current. When phototube current flows, the cathode to anode voltage decreases slightly and the charging current decreases accordingly. Thus the compensating voltage introduced between the anode and ground is slightly greater than is then required. However, the resultant anode to ground voltage differs only negligibly from that which would result if phototube current alone were flowing through resistor 14.

What we claim as new and desire to secure by Letters Patent of the United States is:

In an alternating-current power supply for an electron multiplier phototube having a plurality of electrodes including an anode, the combination of power-supply transformer means including two secondary windings, the first such secondary winding having a plurality of taps connected to respective ones of such electrodes, a compensating voltage circuit consisting of a resistor and a capacitor connected in series across the second such secondary winding with terminals at a center tap on the winding and at the junction of the resistor and the capacitor, and a load impedance connected in series with the compensating voltage circuit between such anode and one end of the first secondary winding, so that the voltage drop across the load impedance from charging currents due to the phototube interelectrode capacitances is neutralized by an equal voltage of opposite phase across the voltage compensating circuit, whereby such charging currents produce substantially no voltage at the phototube anode.

FRANK J. MOLES.
PHILIP C. MICHEL.

REFERENCES CITED

The following references are of record in the file of this patent:

UNITED STATES PATENTS

| Number | Name | Date |
| --- | --- | --- |
| 1,688,292 | Weaver | Oct. 16, 1928 |
| 1,930,541 | Shoup | Oct. 17, 1933 |
| 2,219,676 | Barber | Oct. 29, 1940 |
| 2,225,353 | Scheldorf | Dec. 17, 1940 |
| 2,241,533 | Bliss | May 13, 1941 |
| 2,290,775 | Snyder, Jr. | July 21, 1942 |
| 2,396,706 | Kott | Mar. 19, 1946 |
| 2,417,023 | Sweet | Mar. 4, 1947 |
| 2,418,574 | Cawein | Apr. 8, 1947 |